(12) United States Patent
Ho et al.

(10) Patent No.: US 8,647,733 B2
(45) Date of Patent: Feb. 11, 2014

(54) ADHESIVE-BACKED POLYMERIC FILM STORAGE METHOD AND ASSEMBLY

(75) Inventors: Charlie C. Ho, Woodbury, MN (US); Stephen M. Stark, Woodbury, MN (US); Kenneth J. Halford, Woodbury, MN (US); Dale R. Stewart, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 512 days.

(21) Appl. No.: 12/528,378

(22) PCT Filed: Mar. 6, 2008

(86) PCT No.: PCT/US2008/056021
§ 371 (c)(1),
(2), (4) Date: Dec. 2, 2009

(87) PCT Pub. No.: WO2008/109733
PCT Pub. Date: Sep. 12, 2008

(65) Prior Publication Data
US 2010/0086720 A1    Apr. 8, 2010

Related U.S. Application Data

(60) Provisional application No. 60/893,565, filed on Mar. 7, 2007.

(51) Int. Cl.
*B32B 9/00* (2006.01)

(52) U.S. Cl.
USPC .......................... 428/41.7; 428/41.8; 156/249

(58) Field of Classification Search
USPC ................. 428/41.7, 41.8; 156/249
See application file for complete search history.

(56) References Cited

U.S. PATENT DOCUMENTS

| 2,622,656 | A | * | 12/1952 | Pinsky | .......................... 428/41.7 |
| 5,340,629 | A | * | 8/1994 | Rodighiero | .................. 428/41.8 |
| 5,405,675 | A | | 4/1995 | Sawka et al. | |
| 5,468,532 | A | | 11/1995 | Ho et al. | |
| 5,839,250 | A | * | 11/1998 | Hibler | .......................... 52/746.1 |
| 6,383,644 | B2 | | 5/2002 | Fuchs | |
| 6,607,831 | B2 | | 8/2003 | Ho et al. | |
| 2008/0199704 | A1 | * | 8/2008 | Ho et al. | ........................ 428/412 |

FOREIGN PATENT DOCUMENTS

| JP | 2002173649 | 6/2002 |
| WO | WO 92/22619 | 12/1992 |
| WO | WO 93/24551 | 12/1993 |
| WO | WO 03/011995 | 2/2003 |
| WO | WO 2006/118883 | 11/2006 |
| WO | WO 2008/042883 | 4/2008 |

OTHER PUBLICATIONS

"Scotchgard Paint Protection Film SGH6 and SGH12 for Professional Applicators" Scotchgard Technical Data Sheet, Sep. 2005.
Search Report.

* cited by examiner

*Primary Examiner* — Sang Kim
(74) *Attorney, Agent, or Firm* — Philip P. Soo

(57) ABSTRACT

An adhesive-backed polymeric film assembly that comprises: a polymeric film having one layer or multiple layers, a back surface and a front surface, with an adhesive bonded to the back surface; and a release liner having an outer surface and an inner surface releaseably bonded to the adhesive, wherein the assembly is wound into a roll, with the outer surface of the release liner facing outwardly and the front surface of the polymeric film facing inwardly.

19 Claims, 2 Drawing Sheets

US 8,647,733 B2

ADHESIVE-BACKED POLYMERIC FILM STORAGE METHOD AND ASSEMBLY

CROSS REFERENCE TO RELATED APPLICATIONS

This application is a national stage filing under 35 U.S.C. 371 of PCT/US2008/056021, filed Mar. 6, 2008, which claims priority to U.S. Provisional Application No. 60/893,565, filed Mar. 7, 2007, the disclosure of which is incorporated by reference in its/their entirety herein.

The present invention pertains to adhesive-backed protective and/or decorative polymeric films with a release liner protecting the adhesive backing, in particular, to such assemblies where the polymeric film exhibits a relatively low modulus of elasticity, and more particularly, to a method of storing such adhesive-backed polymeric film assemblies.

BACKGROUND

Films that include one or more layers of a polyurethane material are known. Some of these films are disclosed in U.S. Pat. Nos. 6,607,831, 5,405,675, 5,468,532 and 6,383,644, United States Patent Publication No. US 2006/0127666, as well as International (PCT) Patent Application No. PCT/EP93/01294 (i.e., Publication No. WO 93/24551) and No. PCT/US2006/015699 (i.e., Publication No. WO 2006/118883). Some of these films have been used in surface protection applications. For example, actual film products that have been used to protect the painted surface of selected automobile body parts include multilayer films manufactured by 3M Company, St. Paul, Minn., under the product designations Scotchcal™ high performance protective film PUL0612, PUL1212 and PUL1212DC.

These polymeric films are often backed with a pressure sensitive adhesive which is protected with a conventional release liner. Such film assemblies are often wound into rolls, with the front surface of the polymeric film facing outward and the surface of the release liner facing inward. In addition, discrete pieces of such adhesive-backed film are often die cut out of such a rolled film assembly, with each piece having a surface area with a desired 2-dimensional shape and a peripheral edge that defines the 2-dimensional shape of the surface area. These discrete pieces of film are usually removed from the release liner and applied separately to a desired location on the surface of a substrate.

SUMMARY OF THE INVENTION

It has been uncovered that there are times when such discrete pieces of such a film assembly can be cut to a desired shape, within acceptable tolerances, but when it comes time to remove one of the pieces of adhesive-backed film from the liner and apply it to the substrate, the piece of film is no longer within dimensional tolerances. It has been observed that for an adhesive-backed polymeric film assembly, including a piece of such polymeric film assembly, that is wound into a roll using the conventional method, when the polymeric film is removed from the release liner, it noticeably grows or elongates in length and may also noticeably grow or elongate in width. While some such elongation may be within acceptable tolerances for some applications, it has been observed that increases of 0.4% or more, or even as little as 0.3%, in the 2-dimensional size (i.e., width and/or length) of such film assemblies will typically fall out of acceptable tolerances. This can result in the piece of adhesive-backed film not being suitable for its intended application. It has been discovered that by winding such adhesive-backed polymeric film assemblies in a manner that is opposite to the standard practice, this problem can be avoided. That is, the present invention involves winding such a film assembly such that the outer surface of the release liner faces outwardly and the front surface of the polymeric film faces inwardly.

Therefore, in accordance with one aspect of the present invention, an adhesive-backed polymeric film assembly is provided that comprises: a polymeric film having one layer or multiple layers, a back surface and a front surface, with an adhesive bonded to the back surface; and a release liner having an outer surface and an inner surface releaseably bonded to the adhesive, wherein the assembly is wound into a roll, with the outer surface of the release liner facing outwardly and the front surface of the polymeric film facing inwardly.

The polymeric film can comprise from zero up to 10% polyurea, based on the total weight of the polymeric film. It has been found desirable for the polymeric film to comprise a polyurethane.

A suitable polymeric film for practicing the present invention is one that will elongate at least 3% when subjected to an applied tensile stress of at least 4 MPa. Polymeric films that will elongate at least 3% when subjected to an applied tensile stress of at least 5 MPa can also be suitable for practicing the present invention. In addition, polymeric films that elongate at least 3% when subjected to an applied tensile stress of at least 6 MPa may also be suitable for practicing the present invention.

The polymeric film can be a transparent, or at least translucent, paint protection film, with the adhesive beings a pressure sensitive adhesive. The polymeric film can also be an opaque decorative film, with the adhesive being a pressure sensitive adhesive. In addition, the polymeric film can be an opaque and pigmented paint replacement film, and the adhesive can but does not necessarily need to be a pressure sensitive adhesive.

The polymeric film can have a surface area with a desired 2-dimensional shape and a peripheral edge that defines the 2-dimensional shape of the surface area. The polymeric film can also comprise multiple discrete adhesive-backed polymeric films, with the adhesive on the back surface of each the discrete films being releaseably bonded to the inner surface of the single release liner, and each of the discrete films can have a surface area with a desired 2-dimensional shape and a peripheral edge that defines the 2-dimensional shape of the surface area. The 2-dimensional shape defined by the peripheral edge of each film can be designed to cover a corresponding area of a substrate. Such substrates can include, for example, at least one body part of a vehicle (e.g., an automobile, aircraft, watercraft, etc.).

In accordance with another aspect of the present invention a method of storing an adhesive-backed polymeric film assembly is provided that comprises providing an adhesive-backed polymeric film and release liner in the form of an assembly as described above; and winding the assembly into a roll, with the outer surface of the release liner facing outwardly and the front surface of the polymeric film facing inwardly.

This method can further comprise: forming a peripheral edge that defines a surface area of the polymeric film having a desired 2-dimensional shape. This method can also comprise: forming multiple discrete films from the polymeric film, with each discrete film having a surface area with a desired 2-dimensional shape and a peripheral edge that defines the 2-dimensional shape of the surface area.

In accordance with an additional aspect of the present invention a method is provided for using the adhesive-backed polymeric film assembly that is stored as described above, where this method of use comprises: removing the release liner and applying at least one adhesive-backed polymeric film to a substrate. Such a substrate can be at least one body part of a vehicle (e.g., an automobile, aircraft, watercraft, etc.).

It is to be understood that the following drawings and detailed description are for illustration purposes only and should not be read in a manner that would unduly limit the scope of this invention.

DETAILED DESCRIPTION OF THE PREFERRED EMBODIMENTS

In describing preferred embodiments of the invention, specific terminology is used for the sake of clarity. The invention, however, is not intended to be limited to the specific terms so selected, and each term so selected includes all technical equivalents that operate similarly.

Figure 1:
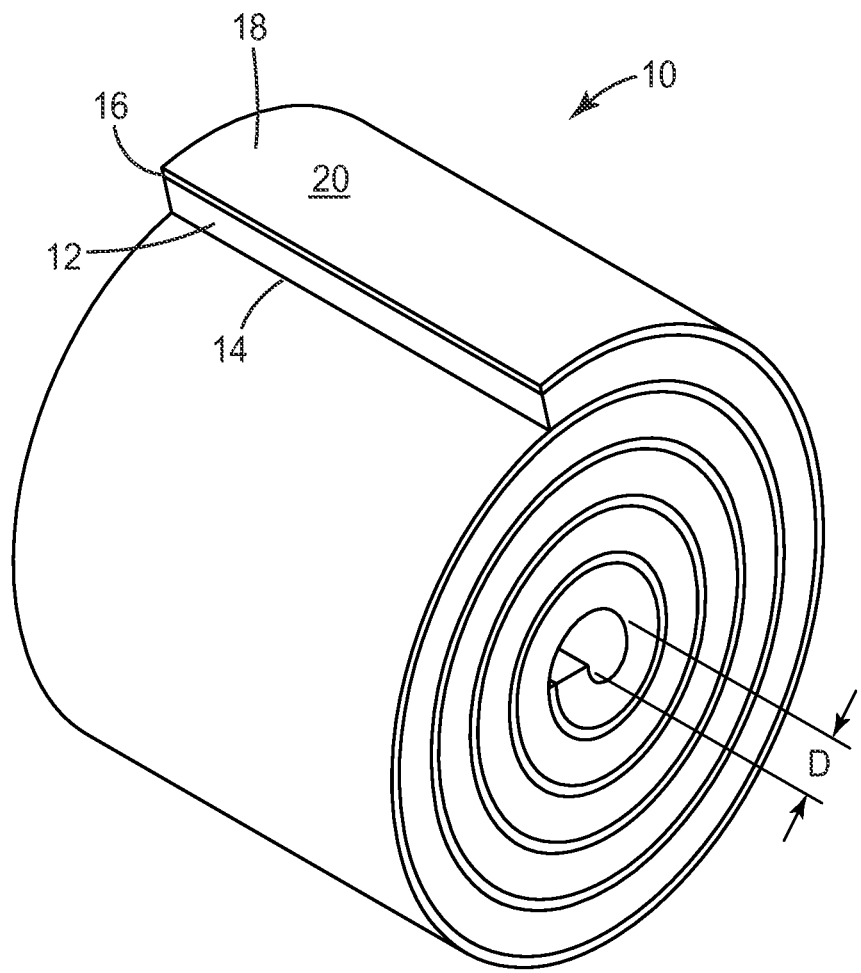
FIG. 1 is a perspective view of an adhesive-backed polymeric film assembly that is wound into a roll in accordance with the principles of present invention.

In the practice of the present invention, and referring to FIG. 1, an adhesive-backed polymeric film assembly 10 is provided that comprises: a polymeric film 12 having one layer or multiple layers, a back surface and a front surface 14, with an pressure sensitive adhesive 16 permanently bonded to the back surface; and a release liner 18 having an outer surface 20 and an inner surface releaseably bonded to the adhesive, wherein the assembly is wound around a core having a diameter D to form a roll, with the outer surface 20 of the release liner 18 facing outwardly and the front surface 14 of the polymeric film 12 facing inwardly.

The polymeric film can comprise from zero up to 10% polyurea, based on the total weight of the polymeric film. It has been found desirable for the polymeric film to comprise a polyurethane polymeric material. These polymeric materials can include those polyurethane materials and other polymers used in making adhesive-backed films for protecting painted surfaces such as, for example, the painted surfaces of an automobile or other vehicle body.

A suitable polymeric film for practicing the present invention is one that will elongate at least about 3% when subjected to an applied tensile stress of at least about 4 MPa, which corresponds to a film modulus of elasticity of about 133 MPa. Polymeric films that will elongate at least about 3% when subjected to an applied tensile stress of at least about 5 MPa can also be suitable for practicing the present invention, which corresponds to a film modulus of elasticity of about 167 MPa. In addition, polymeric films that elongate at least about 3% when subjected to an applied tensile stress of at least about 6 MPa may also be suitable for practicing the present invention, which corresponds to a film modulus of elasticity of about 200 MPa.

The polymeric film can be a transparent, or at least translucent, paint protection film, with the adhesive beings a pressure sensitive adhesive. The polymeric film can also be an opaque decorative film (i.e., a film operatively adapted for being applied to a painted or unpainted surface of a substrate), with the adhesive being a pressure sensitive adhesive. In addition, the polymeric film can be an opaque and pigmented paint replacement film (i.e., a film operatively adapted for replacing conventional liquid paint used in painting a substrate), and the adhesive can but does not necessarily need to be a pressure sensitive adhesive.

Figure 2:
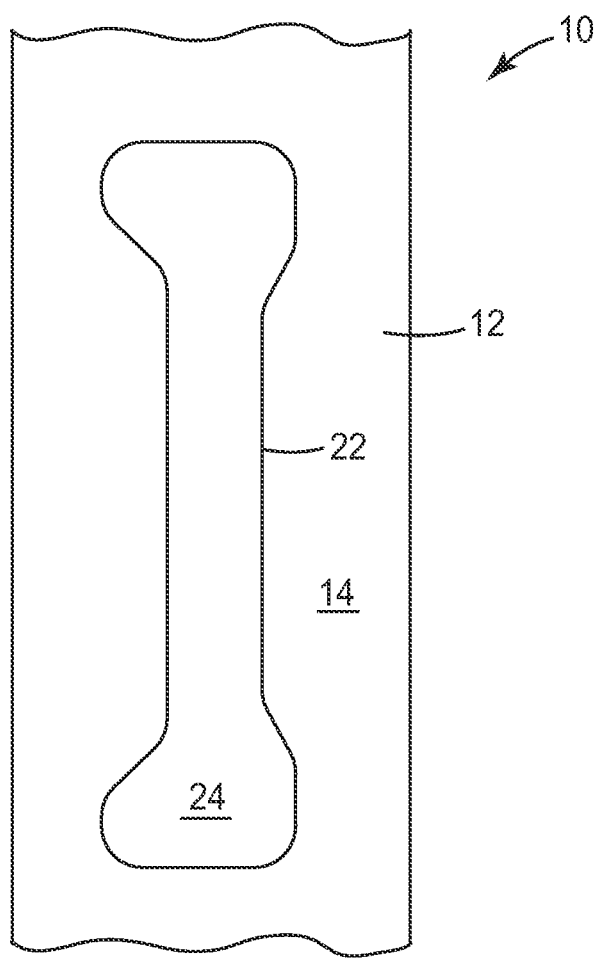
FIG. 2 is a plan view of a length of the film assembly of FIG. 1 with a discrete piece of the film assembly having been die cut in accordance with the present invention.

Referring to FIG. 2, the polymeric film 12 can have a surface area with a desired 2-dimensional shape and a peripheral edge 22 that defines the 2-dimensional shape of the surface area. The polymeric film 12 can also comprise multiple discrete adhesive-backed polymeric films 24, with the adhesive on the back surface of each the discrete films 24 being releaseably bonded to the inner surface of the single release liner 18, and each of the discrete films 24 can have a surface area with a desired 2-dimensional shape and a peripheral edge 22 that defines the 2-dimensional shape of the surface area. The 2-dimensional shape defined by the peripheral edge 22 of each film 24 can be designed to cover a corresponding area of a substrate. Such substrates can include, for example, at least one body part of a vehicle such as, e.g., a wheeled vehicle (e.g., an automobile, truck, bus, van, train, motorcycle, bicycle, etc.), aircraft, watercraft, etc . . .

In the practice of the present invention, a method of storing an adhesive-backed polymeric film assembly is provided that comprises providing an adhesive-backed polymeric film and release liner in the form of an assembly as described above; and winding the assembly into a roll, with the outer surface of the release liner facing outwardly and the front surface of the polymeric film facing inwardly.

This method can further comprise: forming a peripheral edge that defines a surface area of the polymeric film having a desired 2-dimensional shape. This method can also comprise: forming multiple discrete films from the polymeric film, with each discrete film having a surface area with a desired 2-dimensional shape and a peripheral edge that defines the 2-dimensional shape of the surface area.

In the practice of the present invention, a method is provided for using the adhesive-backed polymeric film assembly that is stored as described above, where this method of use comprises: removing the release liner and applying at least one adhesive-backed polymeric film to a substrate. Such a substrate can be at least one body part of a vehicle (e.g., an automobile, aircraft, watercraft, etc.).

EXAMPLES

Example 1

Tests samples were obtained from a roll of a paint protection film (SCOTCHGARD™ Paint Protection Film SGH6 available from 3M, St. Paul, Minn.). Each test was run using three or four strips and the measurements from each strip were averaged. The film construction had a clearcoat over a thermoplastic polyurethane (thickness of the clearcoat and the polyurethane together was 0.006 inch), and a 0.002 inch thick adhesive coated on the side opposite the clearcoat. The pressure-sensitive adhesive was covered by a 0.0067 inch thick paper release liner to protect the adhesive. The standard roll measured 40 yards by 12 inches and had been wound on a 3-inch diameter cardboard core with the liner on the inside and the film on the outside. The roll of film had been stored at ambient conditions (approximately 20° C.) for approximately 1 month. Sample strips measuring 12 inches by 1.25 inches were cut from the roll with the 12 inch dimension in the lengthwise direction. Immediately after cutting some of the adhesive coated films were removed from the liner and measured. In the approximately ten minutes in which the film was removed from the liner, the strips had grown an average of 0.36% (to approximately 12.043 inches) as a result of the film relaxing and because it was no longer held in place on the liner by the adhesive.

Example 2

Strips were cut from the roll as described in Example 1. The adhesive coated and linered strips were placed on a flat surface in a room at ambient temperature (approximately 20° C.) for 3 days. The strips were removed from the liner and measured. They had recovered or shrunk back to an average of 0.31% (12.037 inches).

Example 3

Strips were cut from the roll as described in Example 1. The adhesive coated and release liner protected strips were each rolled into tubes having an inside diameter of 1.5 inches with the film on the outside. No cores were used. The tubes were secured with a rubber band to maintain the 1.5 inch diameter. After 30 minutes at ambient temperature, the film was removed from the liner and measured. The film had grown further to 0.8% (12.096 inches).

Example 4

Samples were prepared as described in Example 3 with the liner on the outside and left at ambient temperature for 30 minutes. The samples were then unwound and rewound into 1.5 inch diameter tubes with the film on the inside, secured with rubber bands, and left for 10 minutes. After 10 minutes, the films were removed from the liner and measured. The film had recovered to 0.23% (12.028 inches).

Example 5

Samples were prepared as described in Example 4 except that after rewinding the rolls with the film on the inside, they were left at ambient temperature for 20 minutes. After 20 minutes, the films were removed from the liner and measured. The film had recovered to 0.17% film growth (12.0204 inches).

Example 6

Strips were cut from the roll as described in Example 1. The adhesive coated and linered strips were placed on a flat surface at ambient temperature for 30 minutes, afterwhich they were rolled into 1.5 inch diameter tubes with the film on the inside, and the liner on the outside. No cores were used and the tubes were secured with a rubber band. After 10 minutes at ambient temperature, the film was removed from the liner and measured. The film growth was found to be 0% so the average length of the strips after being rolled for 10 minutes was 12 inches.

Example 7

A stock roll was prepared by winding 40 yards of the release liner protected and adhesive coated film of Example 1 on a 3 inch diameter core with the film on the inside and the liner on the outside. The film width was 12 inches. After aging at ambient temperature for two weeks, strips measuring 12 inches by 1.25 inches were cut, removed from the liner, and measured. The film growth was 0% so the average length of the strips after about 10 minutes was 12 inches.

Example 8

Film samples rolled, into 1.5 inch diameter tubes, were prepared as described in Example 3 with the film on the inside and the liner on the outside. The samples were aged at various conditions listed below and observed for film popping off from the liner. The films remained adhered to the liners throughout the duration of the tests, and no pop-off was observed in any of the samples after testing.

Test conditions for each set of rolled samples were as follows:
Test condition 1—12 days at 25° C.
Test condition 2—12 days at 50° C.
Test condition 3—12 days at −30° C.
Test condition 4—12 days of thermal cycling (4 days at 50° C., 4 days at −30° C., 4 days at 25° C.)

Example 9

Film sample rolls were prepared and tested as described in Example 8 except that the tubes were 2 inches in diameter. No pop-off of the film from the liner was observed in any of the films after testing.

The above Examples 1-9 illustrate how winding an elastomeric film on a liner with the film on the inside can advantageously prevent film expansion due to stresses on the film. The % film growth of Examples 1-7 is reported in Table 1.

TABLE 1

| Example | Film Condition | % Film Growth from 12" Long Strip |
|---|---|---|
| Example 1 | Std. 3" cored roll of SGH6 | 0.36% |
| Example 2 | Lay Flat 30 min. | 0.31% |
| Example 3 | Rolled 1.5" Tube 30 min. | 0.80% |
| Example 4 | Rolled 1.5" Tube 30 min. + Reverse Rolled 1.5" tube 10 min. | 0.23% |
| Example 5 | Rolled 1.5" Tube 30 min. + Reverse Rolled 1.5" tube 20 min. | 0.17% |
| Example 6 | Rolled 1.5" Tube 30 min. + Reverse Rolled 1.5" tube 30 min. | 0.0% |
| Example 7 | Reverse rolled SGH6 on 3" cored roll | 0.0% |

Examples 10-15

The film strips were rolled into a 1.5 inch inner diameter tube with film on the outside and liner on the inside. The tube was kept for 30 minutes and then peeled the film off the liner and measured the film growth. The % film growth is reported in Table 2. All of the films have significant growth after rolled into 1.5" roll for 30 minutes.

TABLE 2

| % of Film Growth based on a 12 inch Long Strip. | | |
|---|---|---|
| Example | Film | % Film Growth |
| Example 3 | SGH6 Rolled 1.5" ID 30 min | 0.80% |
| Example 10 | 8592 Rolled 1.5" ID 30 min | 0.69% |
| Example 11 | Venture Tape Rolled 1.5" ID 30 min | 0.80% |
| Example 12 | Cleared Avery Rolled 1.5" ID 30 min | 0.79% |
| Example 13 | Clearshield Rolled 1.5" ID 30 min | 0.85% |
| Example 14 | PUL612 Rolled 1.5" ID 30 min | 0.75% |
| Example 15 | Llumar Rolled 1.5" ID 30 min | 0.64% |

Examples 16-21

The films used in Example 10-15 were rolled into 1.5" inner diameter roll for 30 minutes with film on the outside. They were then reverse rolled into 1.5" inner diameter with film on the inside. The rolls were kept for 30 minutes. The films were unrolled and measured film length. All of the films recovered with about 0% film growth.

This invention may take on various modifications and alterations without departing from its spirit and scope. Accordingly, this invention is not limited to the above-described but is to be controlled by the limitations set forth in the following claims and any equivalents thereof.

All patents and patent applications cited above, including those in the Background section, are incorporated by reference into this document in total.

What is claimed is:

1. A method of storing an adhesive-backed polymeric film assembly, said method comprising:
   providing an adhesive-backed polymeric film assembly comprising:
      a polymeric film having a back surface and a front surface, with an adhesive bonded to the back surface; wherein said polymeric film has a surface area with a 2-dimensional shape and a peripheral edge that defines the 2-dimensional shape of said surface area, and said 2-dimensional shape is designed to cover a corresponding area of a substrate; and
      a release liner having an outer surface and an inner surface releaseably bonded to the adhesive,
   winding the assembly into a roll, with the outer surface of the release liner facing outwardly and the front surface of the polymeric film facing inwardly.

2. The method according to claim 1, wherein said polymeric film comprises polyurea.

3. The method according to claim 2, wherein said polymeric film comprises up to 10% polyurea, based on the total weight of said polymeric film.

4. The method according to claim 1, wherein said polymeric film comprises a polyurethane.

5. The method according to claim 1, wherein said polymeric film will elongate at least 3% when subjected to an applied tensile stress of at least 6 MPa.

6. The method according to claim 1, wherein said polymeric film will elongate at least 3% when subjected to an applied tensile stress of at least 5 MPa.

7. The method according to claim 1, wherein said polymeric film will elongate at least 3% when subjected to an applied tensile stress of at least 4 MPa.

8. The method according to claim 1, wherein said polymeric film is a transparent paint protection film, and said adhesive is a pressure sensitive adhesive.

9. The method according to claim 1, wherein said polymeric film is an opaque decorative film, and said adhesive is a pressure sensitive adhesive.

10. The method according to claim 1, wherein said polymeric film is an opaque and pigmented paint replacement film.

11. The method according to claim 10, wherein said adhesive is a pressure sensitive adhesive.

12. The method according to claim 1, wherein said polymeric film comprises multiple discrete adhesive-backed polymeric films, with the adhesive on the back surface of each said discrete film being releaseably bonded to the inner surface of said release liner, and each said discrete film having a surface area with a desired 2-dimensional shape and a peripheral edge that defines the 2-dimensional shape of said surface area.

13. The method according to claim 1, wherein the substrate is at least one body part of a vehicle.

14. The method according to claim 1, further comprising:
   forming a peripheral edge that defines a surface area of the polymeric film having a desired 2-dimensional shape.

15. The method according to claim 1, further comprising:
   forming multiple discrete films from the polymeric film, with each discrete film having a surface area with a desired 2-dimensional shape and a peripheral edge that defines the 2-dimensional shape of the surface area.

16. A method of using the adhesive-backed polymeric film assembly that is stored according to the method of claim 1, said method of use comprising:
   removing the release liner and applying at least one adhesive-backed polymeric film to a substrate.

17. The method according to claim 16, wherein the substrate is at least one body part of a vehicle.

18. The method according to claim 1, wherein said winding reduces elongation of the polymeric film in width or length, as measured after removal from the release liner, to less than that observed if said assembly is wound into a roll with the outer surface of the release liner facing inwardly and the front surface of the polymeric film facing outwardly.

19. The method according to claim 18, wherein said winding reduces elongation of the polymeric film in width or length, as measured after removal from the release liner, to less than 0.3%.

* * * * *